May 2, 1961 A. U. BRYANT 2,982,514

FABRICATED VALVE BODY CONSTRUCTION

Filed Oct. 10, 1957 3 Sheets-Sheet 1

INVENTOR.
Austin U. Bryant

BY Flehr and Swain

ATTORNEYS

FABRICATED VALVE BODY CONSTRUCTION
Filed Oct. 10, 1957
3 Sheets-Sheet 2
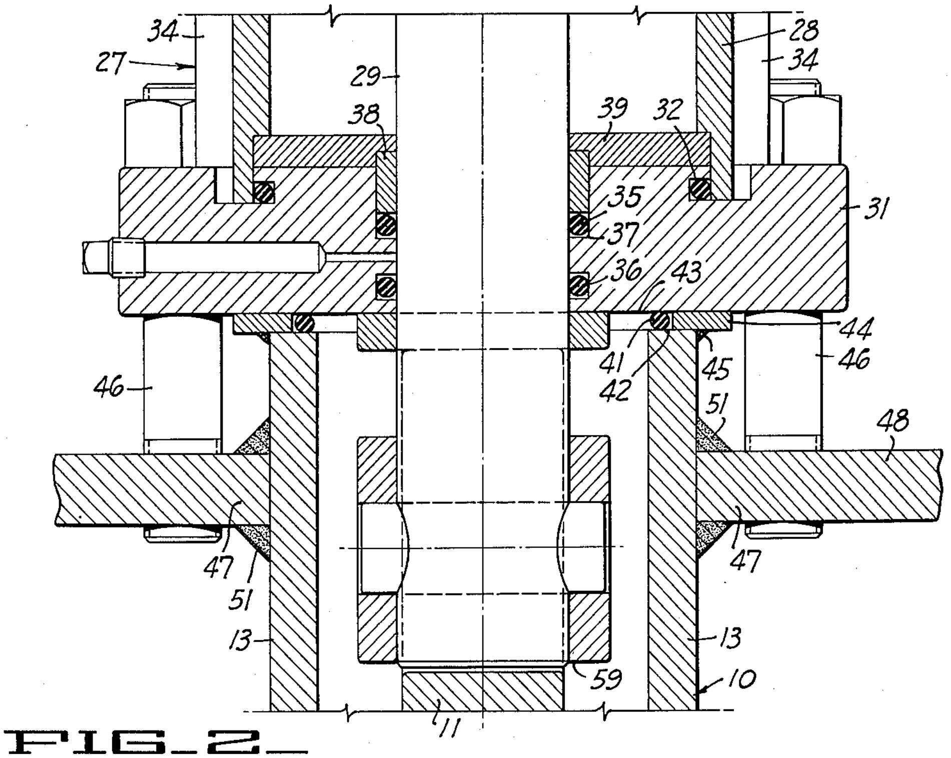
FIG_2_
FIG_3_
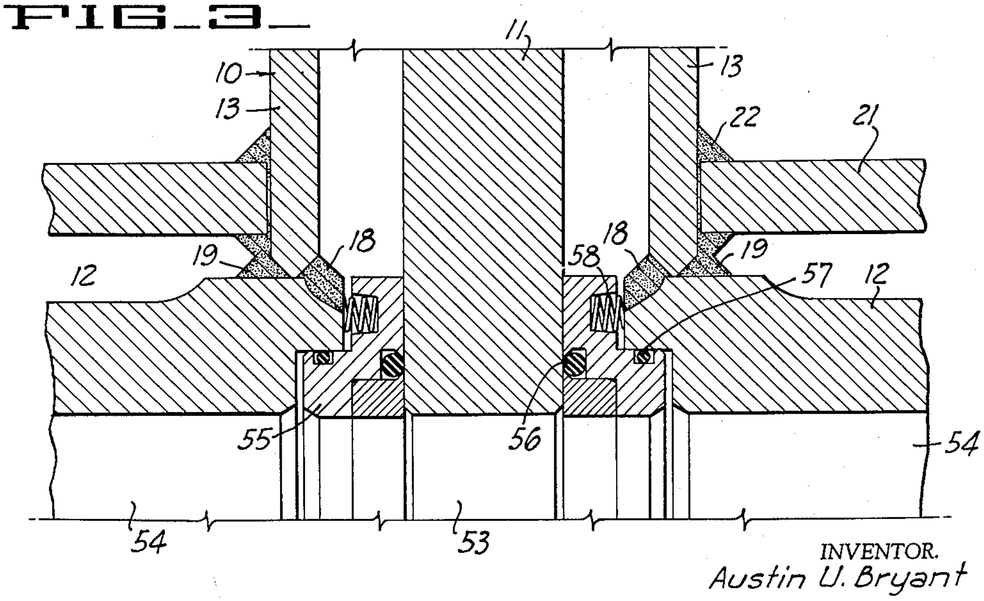
INVENTOR.
Austin U. Bryant
BY Flehr & Swain
ATTORNEYS May 2, 1961 A. U. BRYANT 2,982,514
FABRICATED VALVE BODY CONSTRUCTION
Filed Oct. 10, 1957 3 Sheets-Sheet 3

INVENTOR.
Austin U. Bryant
BY Flehr and Swain
ATTORNEYS

United States Patent Office 2,982,514

Patented May 2, 1961

2,982,514

FABRICATED VALVE BODY CONSTRUCTION

Austin U. Bryant, Walnut Creek, Calif., assignor to Grove Valve and Regulator Company, Oakland, Calif., a corporation of California Filed Oct. 10, 1957, Ser. No. 689,329

2 Claims. (Cl. 251—329)

This invention relates generally to the construction of fluid flow control valves of the gate type. More particularly it is concerned with the construction of valve bodies of the fabricated type, made by welding together metal parts.

In the construction of commercial valves of the gate type, it has been common practice to cast the body integral with short conduit sections or pipe coupling hubs. Such valve bodies are subject to various objections, including high cost of manufacture when made for the higher operating pressures and pipe sizes, and rejects due to blow holes, porous spots, and like casting defects. More recently valve bodies have been fabricated from standard steel shapes, such as steel plate, angles, channels and the like. A valve body of this type is disclosed and claimed in copending application Serial No. 498,253, filed March 31, 1955, now Patent No. 2,904,306 granted Sept. 15, 1959. The body in that instance consists of flat front and side walls formed of standard steel forms welded together to form a tube. The front walls have aligned openings for accommodating pipe coupling hubs. At one end of the body there is a flange in the form of a steel plate having a continuous weld between its inner periphery and the outer periphery of the body. This flange is drilled and tapped to receive stud bolts for clamping the valve bonnet in place. A flange of this type has been found subject to certain disadvantages. Particularly there appears to be a concentration of stresses near the corners of the body, with resulting tendency for corner cracks to appear. To compensate for this the valve body has been designed to reduce the load on the flange plate. Furthermore, formation of a continuous weld between the flange plate and the front and side walls of the body is a relatively troublesome and expensive operation.

In general it is an object of the present invention to provide an improved fabricated valve body construction having a novel type of flange means for attachment of the valve bonnet. In particular the flange means is capable of carrying relatively heavy loads without excessive stressing.

A further object of the invention is to provide an improved fabricated body of the above character which avoids excessive stresses in the weld connection, and which facilitates manufacture.

Additional objects and features of the invention will appear from the following description in which the preferred embodiment has been illustrated in detail in conjunction with the accompanying drawing.

Referring to the drawing:

Figure 2 is a detail on an enlarged scale and in section, illustrating the manner in which the valve bonnet is attached to the body.

Figure 3 is an enlarged detail in section illustrating the sealing means incorporated in the valve of Figure 1.

Figure 1:
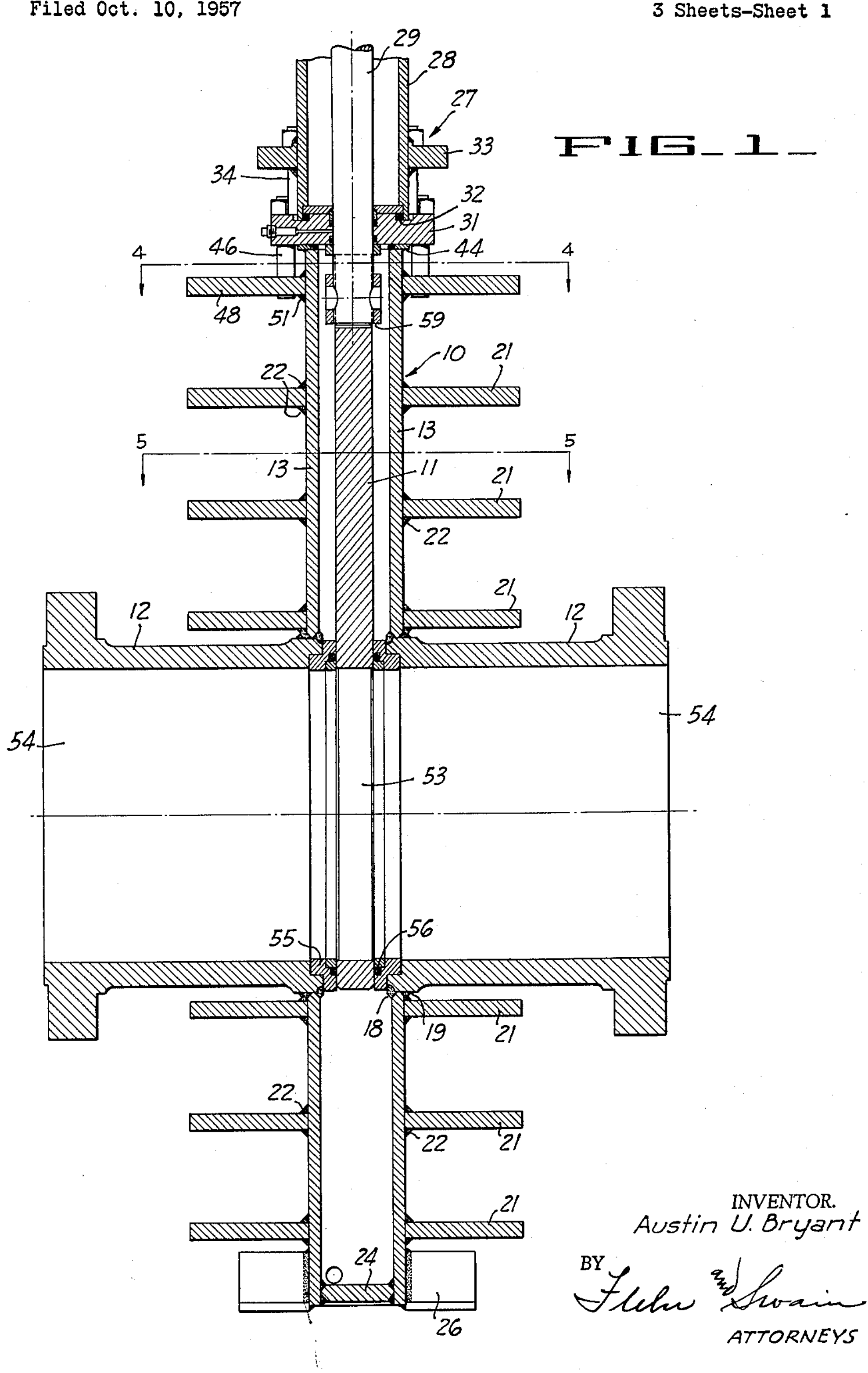
Figure 1 is a side elevational view in section illustrating a complete gate valve having a body constructed in accordance with the present invention.
Figures 4, 5:
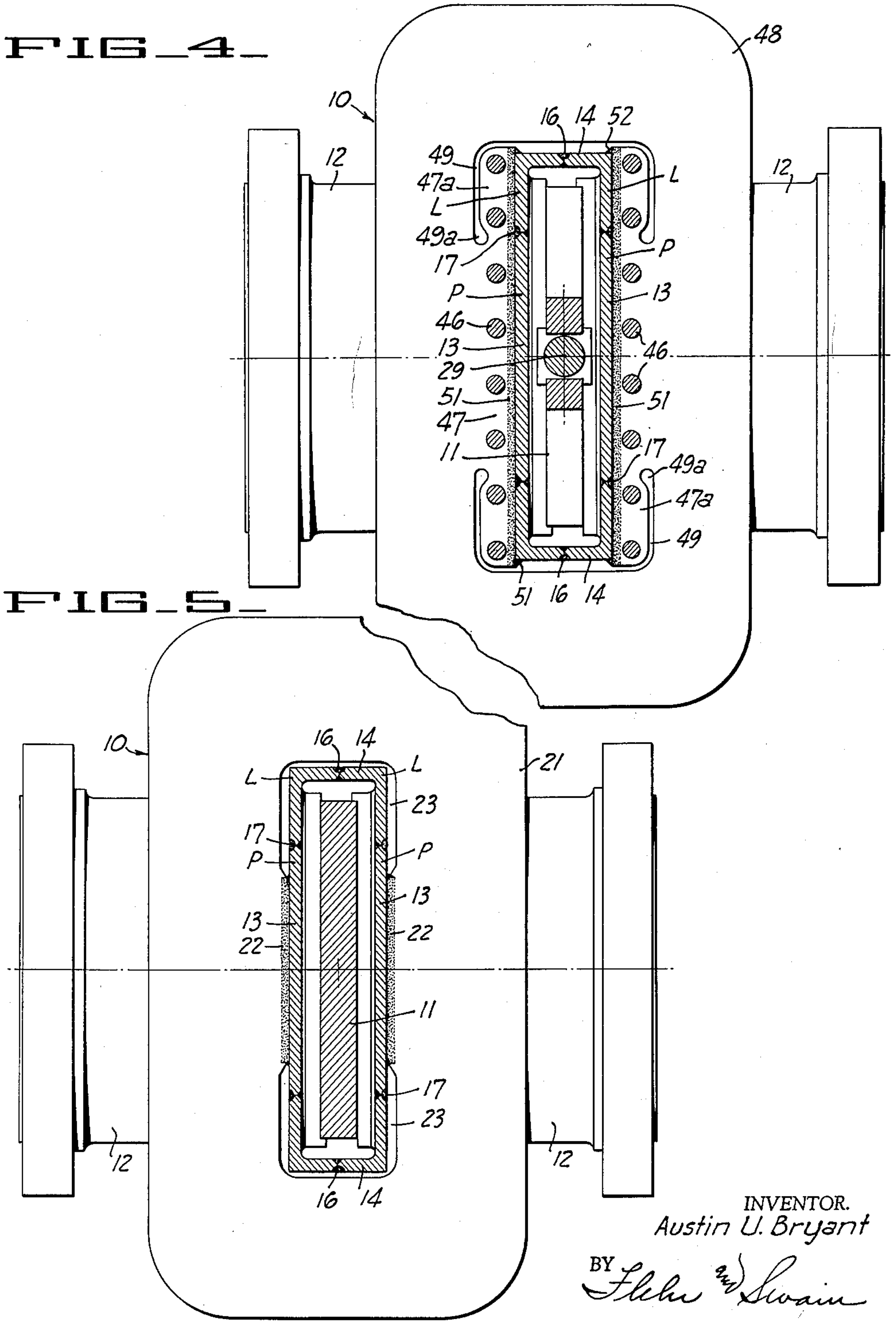
Figure 4 is a cross sectional detail taken along the line 4—4 of Figure 1.
Figure 5 is a cross sectional detail taken along the line 5—5 of Figure 1.

The valve illustrated in Figure 1 consists generally of the main fabricated body 10, which houses the gate 11, and which is provided with pipe coupling hubs 12. The shaping of the main body part is such as to provide a tube formed by spaced parallel front walls 13 and the side walls 14. The front walls have aligned openings for accommodating the hubs. Various standard structural steel shapes can be used for fabricating such a body. In the assembly illustrated in Figures 4 and 5, four structural steel angles and two steel plates are employed. The angles L are attached together and to the steel plates P by longitudinal weld connections 16 and 17. In other instances a channel may be used in place of each pair of angles. Also the body may be made entirely of steel plate, secured together along longitudinal weld connections coincident with the corners of the body. In any event the fabricated body tube in section is of rectangular configuration.

At a proper point in the fabricating procedure, the hubs 12, which may be made of cast steel, are welded to the front walls 13, as by means of the inner and outer circular weld connections 18 and 19.

As explained in said copending application, Serial No. 498,253, the front walls 13 may be reinforced against outward bulging by means of the hooplike plates 21. When employed, the number, size and positioning of these plates can depend largely upon the operating pressures for which the valve body is designed. For the particular embodiment illustrated, several of these plates are assembled upon both portions of the body that extend laterally from the hubs. Each of these plates is attached to the front walls 13 in the manner illustrated in Figure 5. Thus weld connections 22 are provided which terminate short of the longitudinal corners of the body, thus leaving the plate free of the side portions of the body along the regions 23.

One end of the body is shown provided with a closure 24, which may be in the form of a steel plate welded to the adjacent portions of the front and side walls. The same end of the body may be provided with welded on feet 26, for conveniently supporting the valve in vertical position.

The other end, or in this instance the upper end of the body is adapted for attachment with the bonnet assembly 27. This assembly may consist of the pipe 28 which surrounds the valve operating stem 29. One end of the pipe 28 is seated upon the flanged base 31 and is sealed with respect to the same, as by means of a resilient seal ring 32 of the O-ring type. A flange 33 on the pipe 28 is attached to base 31 as by means of bolts 34. Resilient seal rings 35 and 36 of the O-ring type are carried by the base 31 and provide a seal between this part and the operating stem 29. Ring 35 is held within its accommodating recess 37 by a sleeve 38, which in turn is held in place by the plate 39. The peripheral edge of this plate is engaged and retained by the pipe 28.

Another resilient seal ring 41 of the O-ring type is interposed between the upper machined end 42 of the valve body, and the opposed face 43 of the base 31. This O-ring is held in place by a metal retaining gasket 44, which is attached to the body as by weld connection 45.

The flanged base 31 of the bonnet is secured to the body by the stud bolts 46. These bolts engage the flange portions 47 (Figure 4), which are formed as an integral part of the hooplike steel plate 48. This plate can be formed with an outer configuration similar to that of the plates 21. The end parts of the flange portions indicated at 47*a* are separated from the main body of the plate 48 by the slots 49. In practice during manufacture such slots can be formed by conventional oxyacetylene torch cutting technique. In practice it is convenient to use such torch cutting for forming the opening in the plate 48 which receives the body, and in the same operation to form the slots 49. In the particular proportions illustrated each slot has a length substantially equal to one-fourth the width of the body. The closed end portion 49*a* of each slot can be slightly enlarged and rounded as illustrated, to minimize concentration of stresses. The extremity of each flange part 47*a* is shown extending slightly beyond the adjacent side wall 14, to facilitate formation of a suitable weld attachment. During manufacture the plate 48 is properly positioned over the end of the body, and then the flange portions 47 attached by the weld connections 51. These connections extend entirely across the front walls 13, thus providing adequate strength for the forces exerted by the clamping bolts 46. Additional weld connections 52 are preferably provided between the extremities of the parts 47*a* and the longitudinal corners of the body.

The remaining structural features of the valve may be as illustrated in the drawing. Thus the gate can be in the form of a flat steel plate, having a port 53 adapted to register with the passages 54 through the hubs 12, for full open position of the valve. Seat rings 55, carrying resilient seal rings 56 of the O-ring type, are shown interposed between the inner ends of the hubs and the side faces of the gate. These rings are sealed with respect to the hubs by means of seal rings 57 of the O-ring type, and they are urged toward the side faces of the gate by compression springs 58. Sealing means of this type is disclosed in the aforesaid copending application Ser. No. 498,253 and is also disclosed and claimed in copending application Serial No. 475,106, filed December 14, 1954. The operating rod or stem 29 is connected with suitable operating gear, and has its inner end 59 connected to the gate 11.

The fabricated body construction described above provides an adequate flange for attachment of the valve bonnet, and the troublesome features of prior flange constructions are avoided. The manner in which the flange portions 47 are formed in conjunction with the plate 48 avoids troublesome concentration of stresses such as has been experienced with prior flange constructions. Particularly the manner in which the flange parts 47*a* are separated from the body of the plate by the slots 49, tends to prevent a concentration of stresses in the corners of the plate near the corners of the body. Thus for a plate of given size and tensile strength, greater loads can be carried, having reference particularly to effectively resisting bulging of the front walls. This is attributed to the fact that for a given load applied to the plate, the amounts in the region of the inner corners and the slots are reduced, thus effectively reducing the stressing. The slots also serve to reduce the shear and tension stresses on the weld connection. Furthermore, the construction facilitates the manufacture of a fabricated body having flanges of adequate strength for attachment of bonnet. It will be noted that weld connections required are only to the front walls and corners of the body tube. The flange does not extend completely about the body as in prior construction, and, therefore, no welding to the side walls is required.

I claim:

1. In a valve of the type including a body carrying aligned pipe coupling hubs and having a bonnet assembly mounted thereon, a valve body comprising a body tube formed of spaced front and side walls welded together, the tube having a rectangular configuration in section, the front walls of the body serving to mount pipe coupling hubs, and a hoop-like steel plate disposed to embrace one end of the body tube, inner parallel portions of said plate adjacent the front walls having weld connections to the front walls and forming flange portions for mounting a bonnet assembly, each of the end parts of said flange portions that are located near the corners of the body tube forming peninsulas that are separated from the main body of the plate along cut-away areas and joined with the body of the plate at their bases.

2. A valve construction as in claim 1 in which the extremities of said end parts have weld connections with the longitudinal corners of the body tube.

References Cited in the file of this patent

UNITED STATES PATENTS

| | | |
|---|---|---|
| 1,213,259 | Redding | Jan. 23, 1917 |
| 2,382,584 | Scheyer | Aug. 14, 1945 |
| 2,683,581 | Rovang | July 13, 1954 |
| 2,787,439 | Breadtschneider | Apr. 2, 1957 |
| 2,810,543 | Bryant | Oct. 22, 1957 |
| 2,822,897 | Peterson | Feb. 11, 1958 |

FOREIGN PATENTS

| | | |
|---|---|---|
| 102,367 | Australia | Oct. 27. 1937 |